No. 859,215. PATENTED JULY 9, 1907.
G. GUILBERT.
MOUNT FOR CONDENSING LENSES FOR OPTICAL LANTERNS.
APPLICATION FILED JAN. 30, 1906.
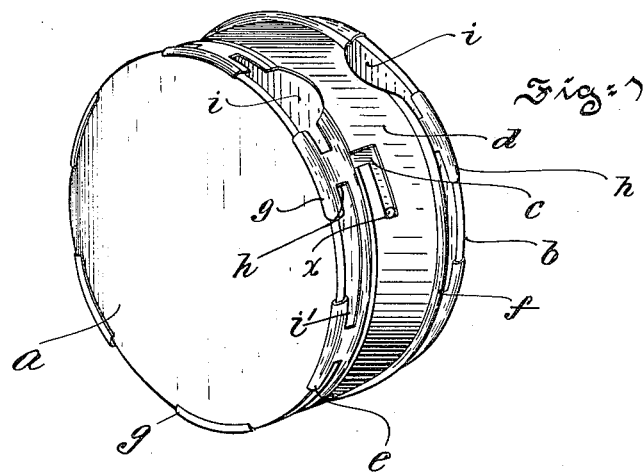
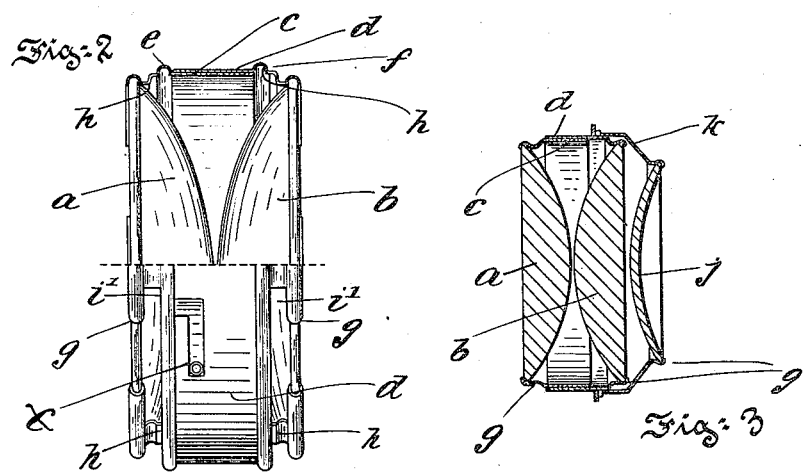
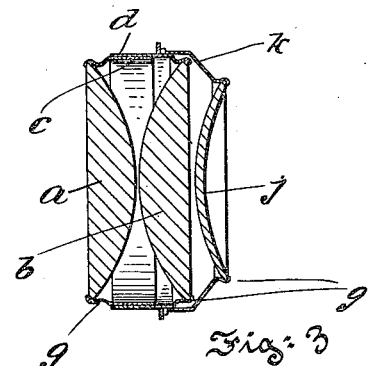

UNITED STATES PATENT OFFICE.

GASTON GUILBERT, OF PARIS, FRANCE.

MOUNT FOR CONDENSING-LENSES FOR OPTICAL LANTERNS.

No. 859,215.  Specification of Letters Patent.  Patented July 9, 1907.

Application filed January 30, 1906. Serial No. 298,598.

*To all whom it may concern:*

Be it known that I, GASTON GUILBERT, a citizen of the Republic of France, residing at Paris, France, have invented certain new and useful Improvements in Mounts for Condensing-Lenses for Optical Lanterns, of which the following is a specification.

Objects of the present invention are to provide for easily mounting and dismounting the lenses; to provide for the free expansion and contraction of the lenses; and to ventilate the space between the lenses.

To these and other ends hereinafter set forth the invention comprises the improvements to be presently described and finally claimed.

The nature, characteristic features and scope of my invention will be more fully understood from the following description taken in connection with the accompanying drawings forming part hereof and in which Figure 1, is a perspective view of a lens mount embodying features of the invention. Fig. 2, is a view, partly in section and partly in elevation, of the same, and Fig. 3, is a transverse sectional view illustrating a modification.

In the drawings $a$ and $b$, are the lenses shown as of the plano-convex variety.

$c$ and $d$, are metal cylinders of which there is one for each lens. One end of each cylinder is furnished with any convenient number of claw-like extensions $g$, of such shape as to form a discontinuous bezel or grooved flange or rim for the reception of the circumferential edge of a lens. Each portion of this discontinuous bezel or claw $g$, is connected to the cylinder by a suitably shaped narrow fluted or corrugated shank, neck or band $h$, which is more or less resilient in a radial direction so as to enable the lens to be placed in position or dismounted by springing the claws $g$, outward to enable the lens to enter or leave the groove of the discontinuous bezel. Where two cylinders $c$ and $d$, are employed to make up the body of the mount, they are formed of such diameters that their open ends may be telescoped one into the other and suitable beads $e$ and $f$, may be provided on the cylinders in order to form stops to insure the positioning of the lenses at a suitable distance apart. The two cylinders $c$ and $d$, may be detachably connected together, for example, by means of the bayonet joint connection $x$. Suitable enlarged openings $i$, may be provided in the cylinders for the insertion of the fingers in order to remove the lenses. The openings $i^1$, between the claws and also the openings $i$, when present, allow air to circulate in the space between the two inner surfaces of the lenses.

The above described means for mounting lenses may be applied advantageously to condensers having more than two lenses, the cylinder or ring $k$, with its claw-like extensions for receiving the third lens $j$, Fig. 3, being mounted on the outermost cylinder of the other two.

According to this invention the lenses may be advantageously mounted or dismounted and a damaged lens may be easily replaced in a very short time. The resilience of the claw-like extensions $g$, not only compensates for any slight variation in the diameters of various lenses but also allows of free expansion and contraction under great variations of temperature, breakage of lenses being thereby largely obviated. The lenses being kept apart by their discontinuous bezels, the customary distance cylinder ordinarily employed is rendered unnecessary. The free circulation of air between the lenses serves to prevent to a considerable extent the accumulation of condensation moisture on the lenses.

It is not my intention by the use of descriptive language or illustration to limit my invention further than the prior state of the art may require, but

Having thus described the nature and objects of my invention, what I claim as new and desire to secure by Letters Patent is:

1. A lens mount for optical lanterns comprising a cylinder provided with claw-like extensions arranged beyond its ends and which constitute a discontinuous bezel that affords ventilation, substantially as described.

2. A lens mount for optical lanterns comprising a cylinder provided beyond the ends thereof with discontinuous bezels which afford ventilation, substantially as described.

3. A lens mount for optical lanterns comprising a cylinder provided beyond the ends thereof with claws having spring shanks of less width than the claws whereby a discontinuous bezel is provided and ventilation afforded, substantially as described.

4. A lens mount for optical lanterns comprising cylinders adapted to be telescopically fitted together and each provided with claws constituting a discontinuous bezel, substantially as described.

5. A lens mount for optical lanterns comprising cylinders adapted to be detachably fitted together and each provided with claws constituting a discontinuous bezel, substantially as described.

6. A lens mount for optical lanterns comprising a cylinder provided with claws constituting a discontinuous bezel and having finger openings between them, substantially as described.

In testimony whereof I have hereunto signed my name in the presence of witnesses.

GASTON GUILBERT.

Witnesses:
 AUGUSTUS E. INGRAM,
 EDWARD W. BIEBEL.